United States Patent
Kim

(10) Patent No.: US 9,728,989 B2
(45) Date of Patent: Aug. 8, 2017

(54) METHOD FOR CHARGING BATTERY INSIDE ELECTRONIC DEVICE WITH A PLURALITY OF POWER SUPPLIES AND A PLURALITY OF CHARGING MODULES WITH USB OTG FUNCTIONALITY

(71) Applicant: Samsung Electronics Co., Ltd., Gyeonggi-do (KR)

(72) Inventor: Soo-Hyung Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 374 days.

(21) Appl. No.: 13/936,531

(22) Filed: Jul. 8, 2013

(65) Prior Publication Data

US 2014/0009120 A1 Jan. 9, 2014

(30) Foreign Application Priority Data

Jul. 9, 2012 (KR) ........................ 10-2012-0074596

(51) Int. Cl.
*H02J 7/00* (2006.01)
*H02J 7/02* (2016.01)
*H02J 17/00* (2006.01)

(52) U.S. Cl.
CPC .......... *H02J 7/0055* (2013.01); *H02J 7/0068* (2013.01); *H02J 7/025* (2013.01); *H02J 2007/0062* (2013.01)

(58) Field of Classification Search
CPC ...... H02J 7/0055; H02J 7/0018; H02J 7/0068; B60L 2240/549

USPC ...................... 320/119, 138, 108; 307/82, 58
See application file for complete search history.

(56) References Cited

U.S. PATENT DOCUMENTS

| | | | | |
|---|---|---|---|---|
| 3,733,534 A | * | 5/1973 | Saslow ................. | H02J 7/0086 320/143 |
| 3,963,976 A | * | 6/1976 | Clark ..................... | H02J 7/008 320/138 |
| 4,006,397 A | * | 2/1977 | Catotti .................. | H02J 7/0091 320/152 |
| 4,065,712 A | * | 12/1977 | Godard ................ | H02J 7/0072 320/144 |

(Continued)

FOREIGN PATENT DOCUMENTS

WO WO 2010148667 A1 * 12/2010 ............... H02J 7/00
WO WO 2012025231 A2 * 3/2012

OTHER PUBLICATIONS

"USB On-The-Go presents benefits, challenges to power designers," Erik Ogren, EETimes, Published May 2, 2003, Seen Online Aug. 5, 2015, http://www.eetimes.com/document.asp?doc_id=1226476.*

(Continued)

*Primary Examiner* — Robert Grant
*Assistant Examiner* — John Trischler
(74) *Attorney, Agent, or Firm* — Cha & Reiter, LLC

(57) ABSTRACT

Methods and apparatus for charging a battery in an electronic device In one exemplary method for charging the battery in the electronic device includes detecting a charging input from a plurality of external devices, and when detecting the charging input, charging the battery with power supplied from the external devices using a plurality of charging modules.

11 Claims, 10 Drawing Sheets

(56) References Cited

U.S. PATENT DOCUMENTS

| | | | | |
|---|---|---|---|---|
| 4,394,611 A * | 7/1983 | Fallon | H02J 7/0073 | 320/139 |
| 4,888,544 A * | 12/1989 | Terry | H02J 7/0073 | 320/155 |
| 5,057,762 A * | 10/1991 | Goedken | H02J 7/0008 | 320/116 |
| 5,122,722 A * | 6/1992 | Goedken et al. | | 320/116 |
| 5,130,634 A * | 7/1992 | Kasai | H02J 7/008 | 320/160 |
| 5,196,780 A * | 3/1993 | Pacholok | H02J 7/027 | 320/148 |
| 5,200,690 A * | 4/1993 | Uchida | H02J 7/0006 | 320/106 |
| 5,225,763 A * | 7/1993 | Krohn | A61M 5/1413 | 320/115 |
| 5,254,931 A * | 10/1993 | Martensson | H02J 7/008 | 320/114 |
| 5,332,957 A * | 7/1994 | Lee | H02J 7/0006 | 320/106 |
| 5,350,996 A * | 9/1994 | Tauchi | H02J 7/0081 | 320/160 |
| 5,391,974 A * | 2/1995 | Shiojima | H02J 7/0091 | 320/150 |
| 5,471,114 A * | 11/1995 | Edwards | H02J 7/0075 | 307/46 |
| 5,477,126 A * | 12/1995 | Shiojima | H02J 7/0091 | 320/138 |
| 5,477,127 A * | 12/1995 | Shiojima | H02J 7/0091 | 320/138 |
| 5,483,145 A * | 1/1996 | Shiojima | H02J 7/0091 | 320/150 |
| 5,497,068 A * | 3/1996 | Shiojima | H02J 7/0091 | 320/150 |
| 5,523,668 A * | 6/1996 | Feldstein | H02J 7/0018 | 320/118 |
| 5,644,207 A * | 7/1997 | Lew | B60K 1/04 | 307/43 |
| 5,646,486 A * | 7/1997 | Edwards | H02J 7/0075 | 307/66 |
| 5,675,235 A * | 10/1997 | Nagai | H02J 7/008 | 320/160 |
| 5,734,254 A * | 3/1998 | Stephens | H02J 7/025 | 320/106 |
| 5,744,937 A * | 4/1998 | Cheon | H02J 7/0006 | 320/106 |
| 5,880,576 A * | 3/1999 | Nagai | H02J 7/0073 | 320/138 |
| 6,118,250 A * | 9/2000 | Hutchison, IV | H02J 7/0024 | 320/110 |
| 6,118,255 A * | 9/2000 | Nagai | H02J 7/0004 | 320/112 |
| 6,124,700 A * | 9/2000 | Nagai | H02J 7/0052 | 320/130 |
| 6,169,341 B1 * | 1/2001 | Nagai | H02J 7/0068 | 307/125 |
| 6,288,522 B1 * | 9/2001 | Odaohhara et al. | | 320/138 |
| 6,326,767 B1 * | 12/2001 | Small | H01M 2/1055 | 320/116 |
| 6,489,751 B2 * | 12/2002 | Small | H01M 2/1055 | 320/150 |
| 6,774,604 B2 * | 8/2004 | Matsuda et al. | | 320/110 |
| 6,847,127 B1 * | 1/2005 | Lee | | 290/40 C |
| 6,949,913 B2 * | 9/2005 | Nagai et al. | | 320/148 |
| 6,956,357 B2 * | 10/2005 | Nagai et al. | | 320/148 |
| 7,262,585 B2 * | 8/2007 | May | | 323/273 |
| 7,424,569 B2 * | 9/2008 | Matsuda | | 710/316 |
| 7,425,815 B2 * | 9/2008 | Wong | H02J 7/041 | 320/114 |
| 7,474,079 B2 * | 1/2009 | Hashimoto | H02J 7/022 | 320/138 |
| 7,489,106 B1 * | 2/2009 | Tikhonov | | 320/116 |
| 7,489,974 B2 * | 2/2009 | Numano | | 700/22 |
| 7,495,414 B2 * | 2/2009 | Hui | H01F 38/14 | 320/107 |
| 7,528,574 B1 * | 5/2009 | Adkins | H01M 10/44 | 320/128 |
| 7,554,298 B2 * | 6/2009 | Okamoto et al. | | 320/138 |
| 7,570,011 B2 * | 8/2009 | Waikar | H02J 7/0055 | 320/103 |
| 7,612,540 B2 * | 11/2009 | Singh | | 320/162 |
| 7,615,965 B2 * | 11/2009 | Popescu-Stanesti | H02J 1/08 | 307/46 |
| 7,657,290 B2 * | 2/2010 | Veselic et al. | | 455/572 |
| 7,711,039 B2 * | 5/2010 | Ruff et al. | | 375/219 |
| 7,834,591 B2 * | 11/2010 | Hussain | H01M 10/44 | 320/128 |
| 7,868,483 B2 * | 1/2011 | Lu | H02J 7/0031 | 307/64 |
| 7,880,445 B2 * | 2/2011 | Hussain | H02J 7/0073 | 320/164 |
| 7,932,694 B2 * | 4/2011 | Watanabe et al. | | 320/113 |
| 7,986,059 B2 * | 7/2011 | Randall | H01R 25/147 | 307/104 |
| 8,004,247 B1 * | 8/2011 | Zhang | | 320/138 |
| 8,150,539 B2 * | 4/2012 | Numano | | 700/22 |
| 8,193,780 B2 * | 6/2012 | Hussain | H02J 7/0073 | 320/164 |
| 8,253,385 B2 * | 8/2012 | Lu et al. | | 320/138 |
| 8,269,467 B2 * | 9/2012 | Li | H02J 7/0091 | 320/153 |
| 8,327,165 B2 * | 12/2012 | Clegg | G06F 1/26 | 713/300 |
| 8,421,401 B2 * | 4/2013 | Wen | | 320/101 |
| 8,447,234 B2 * | 5/2013 | Cook et al. | | 455/41.2 |
| 8,471,533 B2 * | 6/2013 | Hussain | H02J 7/0073 | 320/164 |
| 8,539,266 B2 * | 9/2013 | Kawano | | 713/300 |
| 8,656,193 B2 * | 2/2014 | Hijazi | G06F 1/263 | 713/300 |
| 8,704,484 B2 * | 4/2014 | Rosik | H01M 10/443 | 320/108 |
| 8,810,205 B2 * | 8/2014 | Ichikawa | B60L 11/1816 | 320/104 |
| 8,825,118 B2 * | 9/2014 | Kim | H02J 7/0047 | 455/41.1 |
| 8,841,881 B2 * | 9/2014 | Failing | B60L 3/00 | 307/65 |
| 8,890,470 B2 * | 11/2014 | Partovi | H01F 7/0252 | 320/108 |
| 8,896,264 B2 * | 11/2014 | Partovi | H01F 7/0252 | 320/108 |
| 8,898,363 B2 * | 11/2014 | Saarinen et al. | | 710/305 |
| 8,901,881 B2 * | 12/2014 | Partovi | H01F 7/0252 | 320/108 |
| 8,907,635 B2 * | 12/2014 | Wu | H02J 7/0077 | 320/164 |
| 8,957,632 B2 * | 2/2015 | Gu | H02J 7/025 | 320/108 |
| 8,981,733 B2 * | 3/2015 | Hussain | H02J 7/0073 | 320/162 |
| 8,994,338 B2 * | 3/2015 | Khan et al. | | 320/138 |
| 9,035,600 B2 * | 5/2015 | Park | G06F 1/263 | 307/104 |
| 9,270,139 B2 * | 2/2016 | Rofougaran | H02J 1/10 | |
| 9,278,625 B2 * | 3/2016 | Obayashi | B60L 11/1816 | |
| 9,350,183 B2 * | 5/2016 | Park | G06F 1/263 | |
| 9,356,476 B2 * | 5/2016 | Yu | H02J 9/061 | |
| 9,490,652 B2 * | 11/2016 | Kim | H02J 7/025 | |
| 9,561,730 B2 * | 2/2017 | Widmer | B60L 11/182 | |
| 9,569,003 B2 * | 2/2017 | Rofougaran | G06F 3/017 | |
| 2002/0147036 A1 * | 10/2002 | Taguchi et al. | | 455/573 |
| 2003/0030412 A1 * | 2/2003 | Matsuda et al. | | 320/127 |
| 2003/0214821 A1 * | 11/2003 | Giannopoulos | H02J 7/025 | 363/21.02 |
| 2005/0083016 A1 * | 4/2005 | Yau | H02J 7/0018 | 320/116 |
| 2005/0253560 A1 * | 11/2005 | Popescu-Stanesti | H02J 1/08 | 320/138 |
| 2005/0280399 A1 * | 12/2005 | Karner et al. | | 320/149 |

(56) References Cited

U.S. PATENT DOCUMENTS

| | | | |
|---|---|---|---|
| 2006/0103355 A1* | 5/2006 | Patino et al. | 320/138 |
| 2006/0105718 A1* | 5/2006 | Ozluturk | H04W 8/005 455/67.11 |
| 2006/0145666 A1* | 7/2006 | Liu | 320/138 |
| 2006/0250112 A1* | 11/2006 | Waikar | H02J 7/0055 320/128 |
| 2007/0178945 A1* | 8/2007 | Cook | H02J 17/00 455/572 |
| 2008/0094029 A1* | 4/2008 | Singh | 320/118 |
| 2008/0174277 A1* | 7/2008 | Ueno | 320/138 |
| 2008/0265838 A1* | 10/2008 | Garg et al. | 320/115 |
| 2009/0079394 A1* | 3/2009 | Richards et al. | 320/134 |
| 2009/0174366 A1* | 7/2009 | Ahmad et al. | 320/114 |
| 2009/0256530 A1* | 10/2009 | Wang | H02J 7/0072 320/164 |
| 2009/0273316 A1* | 11/2009 | Lee | H02J 7/0055 320/138 |
| 2010/0033018 A1* | 2/2010 | Fukasawa | H02J 7/0036 307/80 |
| 2010/0060239 A1* | 3/2010 | Lundqvist et al. | 320/138 |
| 2010/0064153 A1* | 3/2010 | Gk et al. | 713/310 |
| 2010/0070659 A1* | 3/2010 | Ma et al. | 710/14 |
| 2010/0169534 A1* | 7/2010 | Saarinen | G06F 13/385 710/316 |
| 2010/0244774 A1* | 9/2010 | Lu et al. | 320/138 |
| 2010/0270968 A1* | 10/2010 | Reese et al. | 320/103 |
| 2010/0295376 A1* | 11/2010 | Black | H02J 7/0068 307/80 |
| 2010/0301808 A1* | 12/2010 | David | 320/138 |
| 2011/0001485 A1* | 1/2011 | Feight | H02J 1/10 324/500 |
| 2011/0016333 A1* | 1/2011 | Scott et al. | 713/300 |
| 2011/0025263 A1* | 2/2011 | Gilbert | 320/108 |
| 2011/0025277 A1* | 2/2011 | Hussain | H01M 10/44 320/163 |
| 2011/0050164 A1* | 3/2011 | Partovi | H01F 5/003 320/108 |
| 2011/0156636 A1* | 6/2011 | Kim | H02J 7/0055 320/108 |
| 2011/0179292 A1* | 7/2011 | Clegg | G06F 1/26 713/300 |
| 2011/0202777 A1* | 8/2011 | Hijazi | G06F 1/263 713/300 |
| 2011/0234148 A1* | 9/2011 | Wen | 320/101 |
| 2011/0241603 A1* | 10/2011 | Chang | H01L 31/02021 320/101 |
| 2011/0318663 A1* | 12/2011 | Chen et al. | 429/429 |
| 2012/0001590 A1 | 1/2012 | Yeh | |
| 2012/0038324 A1 | 2/2012 | Humphrey et al. | |
| 2012/0043931 A1* | 2/2012 | Terao | H02J 7/025 320/108 |
| 2012/0043934 A1 | 2/2012 | Klein | |
| 2012/0091799 A1* | 4/2012 | Rofougaran | H02J 1/10 307/24 |
| 2012/0112716 A1* | 5/2012 | Chen | H02M 3/1584 323/271 |
| 2012/0146591 A1* | 6/2012 | Wu | H02J 7/0077 320/164 |
| 2012/0153717 A1* | 6/2012 | Obayashi | B60L 11/1816 307/9.1 |
| 2012/0153899 A1* | 6/2012 | Marschalkowski et al. | 320/118 |
| 2012/0161697 A1* | 6/2012 | Park | G06F 1/263 320/108 |
| 2012/0200265 A1* | 8/2012 | Fukasawa | H02J 7/0036 320/137 |
| 2012/0223682 A1* | 9/2012 | Hussain | H02J 7/0073 320/164 |
| 2012/0229084 A1* | 9/2012 | Gu | H02J 7/025 320/108 |
| 2012/0239236 A1* | 9/2012 | Eom | 701/22 |
| 2012/0306439 A1* | 12/2012 | Ichikawa | B60L 11/123 320/108 |
| 2013/0076155 A1* | 3/2013 | Yu | H02J 9/061 307/104 |
| 2013/0093388 A1* | 4/2013 | Partovi | H01F 5/003 320/108 |
| 2013/0154550 A1* | 6/2013 | Balmefrezol et al. | 320/107 |
| 2013/0260677 A1* | 10/2013 | Partovi | H01F 5/003 455/41.1 |
| 2013/0334883 A1* | 12/2013 | Kim | H02J 7/34 307/29 |
| 2014/0091764 A1* | 4/2014 | Kinomura et al. | 320/109 |
| 2014/0097697 A1* | 4/2014 | Cho | G06F 1/26 307/104 |
| 2014/0152234 A1* | 6/2014 | Herrmann et al. | 320/107 |
| 2015/0028800 A1* | 1/2015 | Kim | H02J 7/025 320/108 |
| 2015/0357851 A1* | 12/2015 | Huang | H02J 7/0068 320/108 |
| 2016/0218521 A1* | 7/2016 | Huang | H02J 7/025 |

OTHER PUBLICATIONS

Valdigre, "Galaxy S2 USB OTG," XDA, Published May 1, 2011, Accessed Aug. 3, 2015, http://forum.xda-developers.com/galaxy-s2/general/galaxy-s2-usb-otg-t1058612.*

"USB Port & Hub Sync Charger for Mobile Devices by deals.com.kw," Dealscomkw, Published Apr. 16, 2012, Accessed Aug. 3, 2015, https://www.ycutube.comlwatdl?v=aqK9eu6oQHg.*

"Laptop and Notebook Computer Power Adapters," Admin, SwitchPowerAdapter.com, Published Oct. 11, 2010, Accessed Aug. 3, 2015, http://www.switchpoweradapter.com/blog/laptop-and-notebook-computer-power-adapters/.*

"Understanding Wattage in Relationship to Charging," TJinTech, Pub Jan. 11, 2012, Acc Dec. 9, 2015, https://web.archive.org/web/20120111033913/http://www.tjinguytech.com/charging-how-tos/wattage-for-charging.*

"20000mAh 12V rechargeable 18650 li ion battery," Shenzhen Kai Xinda Energy Technology Co. Ltd., Alibaba.com, Google TimeStamped on Sep. 26, 2010, Accessed Dec. 9, 2015, http://www.alibaba.com/product-detail/20000mah-12v-rechargeable-18650-li-ion_1850148043.html?spm=a2700.7724857.29.118.plo0nD.*

Power Monitors, Linear Technology, Published on Wayback Machine Dec. 25, 2011, Accessed Online Dec. 10, 2015, https://web.archive.org/web/20111225111821/http://www.linear.com/products/power_monitors.*

* cited by examiner

METHOD FOR CHARGING BATTERY INSIDE ELECTRONIC DEVICE WITH A PLURALITY OF POWER SUPPLIES AND A PLURALITY OF CHARGING MODULES WITH USB OTG FUNCTIONALITY

CLAIM OF PRIORITY

The present application claims the benefit under 35 U.S.C. §119(a) to a Korean patent application filed in the Korean Intellectual Property Office on Jul. 9, 2012, and assigned Serial No. 10-2012-0074596, the entire disclosure of which is hereby incorporated by reference.

TECHNICAL FIELD

The present disclosure relates generally to charging a battery of an electronic device.

BACKGROUND

Portable electronic devices have advanced to multimedia devices which offer various services such as voice and video telephony functions, an information input/output function, and data storage.

As devices with various capabilities are increasingly used, designers have focused on improving device performance, including battery lifetime, battery charging time and charging mechanisms. Hence, recent electronic devices allow not only wired charging but also wireless charging. In these devices, if both wired and wireless chargers are connected, the battery is selectively charged by a charging module using one of the wired and wireless chargers.

Electronic devices providing a Universal Serial Bus (USB) On-The-Go (OTG) function have been developed. The OTG function enables electronic devices such as a Personal Digital Assistant (PDA), MP3 player, mobile phone, mouse, keyboard, or an external memory, to communicate with one another through the USB without using a computer. For example, an OTG operation can transfer data by connecting the external memory to the mobile phone through the USB.

Typically, in the OTG operation for USB communication between devices, a device acting as a server supplies battery power to a client device. Accordingly, the remaining battery power of the server device is gradually reduced during the OTG operation, and the battery needs to be charged to continue the OTG operation. Conventional devices handle this task by selectively supplying the power to the OTG client using the charging module, or disconnecting the OTG device and then charging the battery through the wireless charger.

SUMMARY

One aspect of the disclosure is to provide a method and an apparatus for charging a battery using a plurality of charging modules in an electronic device.

Another aspect is to provide a method and an apparatus for charging a battery by receiving power supplied from a plurality of external chargers in an electronic device.

Still another aspect is to provide a method and an apparatus for charging a battery using a plurality of charging modules according to a charging capacity of an external charger in an electronic device.

A further aspect is to provide a method and an apparatus for concurrently conducting wired charging and wireless charging using a plurality of charging modules in an electronic device.

A further aspect is to provide a method and an apparatus for charging a battery and performing OTG connection at the same time in an electronic device including a plurality of charging modules.

A further aspect is to provide a method and an apparatus for supplying power for OTG operation through a charging input of an external charger in an electronic device including a plurality of charging modules.

In one exemplary embodiment for charging a battery in an electronic device, detecting a charging input from a plurality of external devices; and when detecting the charging input, charging the battery with power supplied from the external devices using a plurality of charging modules.

In another exemplary embodiment for charging a battery in an electronic device, when a Universal Serial Bus (USB) On-The-Go (OTG) device is connected, supplying power to the USB OTG device using a first charging module; and when detecting a charging input from a second external device, charging the battery with power supplied from the second external device using a second charging module.

In another exemplary embodiment for charging a battery in an electronic device, detecting a charging input from at least one external device, charging the battery using a plurality of charging modules with power supplied from the external device, by dividing a charging current of the charging modules.

In an embodiment, an exemplary electronic device includes: at least one battery, at least one charging module, at least one charging port, at least one processor, a memory, and at least one program stored in the memory and configured for execution by the at least one processor, wherein the program comprises at least one instruction for detecting a charging input from a plurality of external devices, and when detecting the charging input, charging the battery with power supplied from the external devices using a plurality of charging modules.

In an embodiment, an exemplary electronic device includes: at least one battery, at least one charging module, at least one charging port, at least one processor, a memory, and at least one program stored in the memory and configured for execution by the at least one processor, wherein the program comprises at least one instruction for, when a Universal Serial Bus (USB) On-The-Go (OTG) device is connected, supplying power to the USB OTG device using a first charging module, and when a charging input is detected from a second external device, charging the battery with power supplied from the second external device using a second charging module.

In an embodiment, an exemplary electronic device includes: at least one battery, at least one charging module, at least one charging port, at least one processor, a memory, and at least one program stored in the memory and configured for execution by the at least one processor, wherein the program comprises at least one instruction for, when a charging input is detected from at least one external device, charging the battery using a plurality of charging modules with power supplied from the external device, and charging the battery by dividing a charging current of the charging modules.

Other aspects, advantages, and salient features of the disclosed technology will become apparent to those skilled in the art from the following detailed description, which, taken in conjunction with the annexed drawings, discloses exemplary embodiments of the technology.

BRIEF DESCRIPTION OF THE DRAWINGS

The above and other aspects, features, and advantages of certain exemplary embodiments of the present technology will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for charging a battery in an electronic device.

Hereinafter, the electronic device embraces a mobile communication terminal, a Personal Digital Assistant (PDA), a laptop, a smart phone, a netbook, a television, a Mobile Internet Device (MID), an Ultra Mobile Personal Computer (UMPC), a tablet PC, a navigation device, and an MP3 player.

Figure 1:
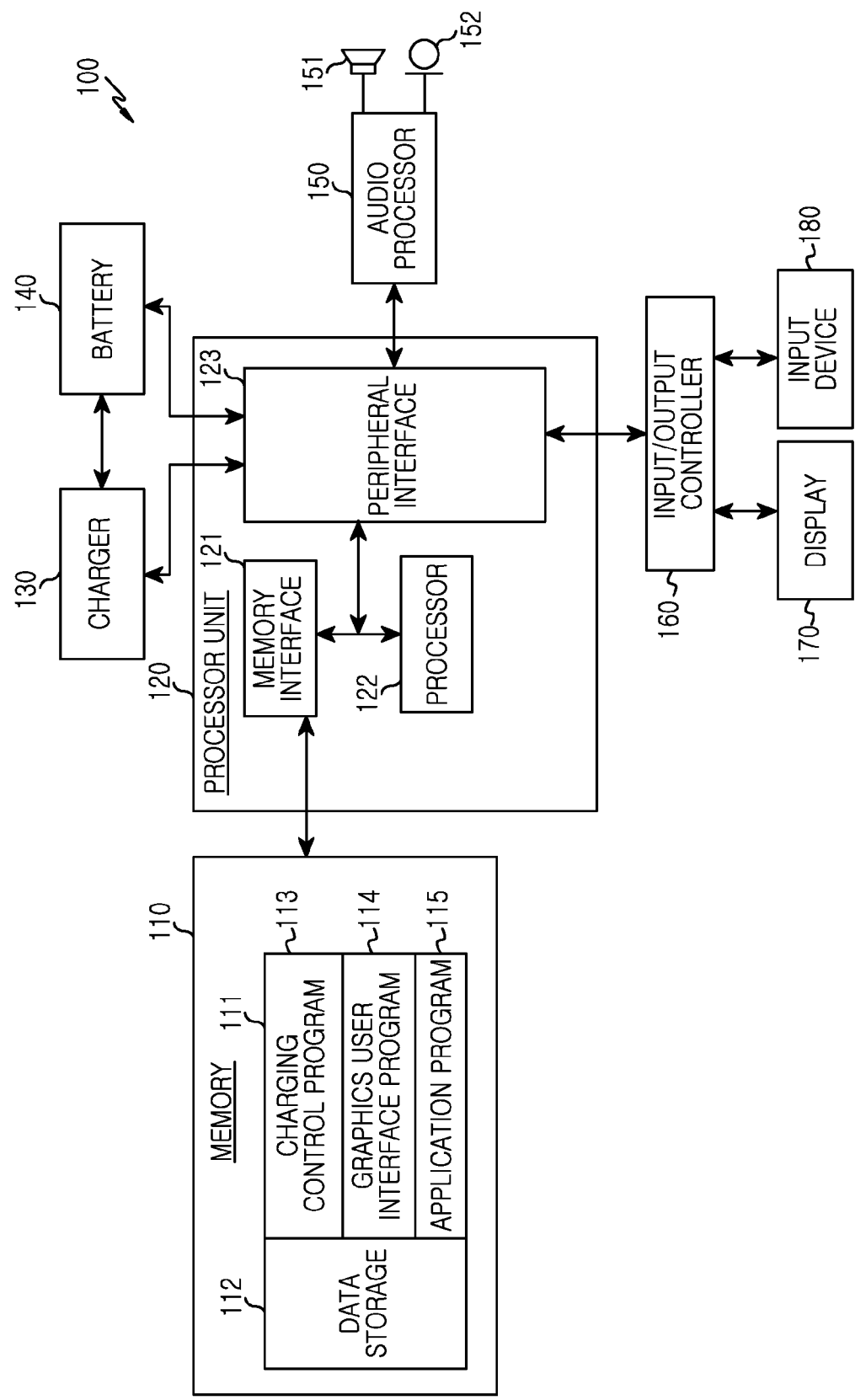
FIG. 1 is a block diagram of an example electronic device according to an exemplary embodiment of the present invention.

FIG. 1 is a block diagram of an example electronic device, 100, according to an exemplary embodiment of the present invention. Device 100 includes a memory 110, a processor unit 120, a charger 130, a battery 140, an audio processor 150, an input/output controller 160, a display 170, and an input device 180. Here, device 100 may include a plurality of memories 110, processor units 120, chargers 130, batteries 140, audio processors 150, input/output controllers 160, displays 170, and input devices 180.

The memory 110 includes a program storage 111 for storing a program to control operations of the electronic device 100, and a data storage 112 for storing data generated in the program execution. For example, the program storage 111 includes a charging control program 113, a graphics user interface program 114, and at least one application program 115. Herein, the program contained in the program storage 111 may be referred to as an instruction set which is a set of instructions.

The charging control program 113 includes at least one software component for controlling charging of the battery (and the OTG connection) 140 using a plurality of charging modules. For example, when a charging current above a reference current is detected from an external charger (e.g., in the methods of FIGS. 4 and 5), the charging control program 113 includes an instruction for charging the battery 140 with power supplied from the external charger using the charging modules. However, when charging current below the reference current is detected the battery 140 may be charged with power supplied from the external charger using only one of the charging modules. When charging current is detected from a plurality of external chargers (e.g., in the methods of FIGS. 6, 7 and 8), the charging control program 113 may include an instruction for charging the battery 140 with the power supplied from all the external chargers using the charging modules.

In addition, the charging control program 113 includes at least one software component for conducting the battery charging and Universal Serial Bus (USB) On-The-Go (OTG) connection using the charging modules. For example, when an OTG device is detected (e.g., in the methods of FIGS. 6, 7 and 8), the charging control program 113 includes an instruction for supplying the power to the OTG device using one of the charging modules. When the OTG device is detected through a second charging port during the charging of a first charging port (e.g., see FIGS. 6, 7 and 8), charging current of the first charging port may be supplied to the OTG device through the second charging port.

The graphics user interface program 114 includes at least one software component for providing and displaying graphics on the display 170. For example, the graphics user interface program 114 displays at least one of the charging state, the charging completion, and the remaining battery power of the electronic device on the display 170 in association with the charging control program 113.

The application program 115 includes a software component for at least one application program installed in the electronic device 100.

The processor unit 120 includes a memory interface 121, at least one processor 122, and a peripheral interface 123. Here, the memory interface 121, the at least one processor 122, and the peripheral interface 123 of the processor unit 120 can be integrated onto at least one integrated circuit or implemented using separate components.

The memory interface 121 controls access of components such as processor 122 or peripheral interface 123, to the memory 110.

The peripheral interface 123 controls connection between an input/output peripheral of the electronic device 100, and the processor 122 and the memory interface 121.

The processor 122 controls the electronic device 100 to provide various multimedia services using at least one software program. In so doing, the processor 122 control execution of at least one program stored in the memory 110 and to provide a service according to the corresponding program.

The processor 122 controls charging of the battery 140 (and the OTG connection) using the plurality of the charging modules by running the charging control program 113. For example, when the charging current above the reference current is detected from the external charger (e.g., in the methods of FIGS. 4 and 5), the processor 122 controls charging the battery 140 using the charging modules. However, when charging current below the reference current is detected, the processor 122 may controls charging of the battery 140 using only one of the charging modules. When charging current is detected from the plurality of the external chargers (e.g., in the methods of FIGS. 6, 7 and 8), the processor 122 may controls charging of the battery 140 using the charging modules.

The processor 122 can conduct the battery charging and the OTG connection using the multiple charging modules by running the charging control program 113. For example, when the OTG device is detected (e.g., in the methods of FIGS. 6, 7 and 8), the processor 122 controls supplying of the power to the OTG device using one of the charging modules. When the OTG device is detected through the second charging port during the charging of the first charging port (e.g., see FIGS. 6, 7 and 8), the processor 122 may controls supplying of the charging current of the first charging port to the OTG device through the second charging port.

The charger 130 charges the battery 140 with the power supplied from at least one external device via at least one charging module according to a control signal(s) of the processor 122.

The charger 130 conducts the charging and the OTG connection according to a control signal(s) of the processor 122.

The audio processor 140 provides an audio interface between a user and the electronic device 100 through a speaker 151 and a microphone 152.

The input/output controller 160 provides an interface between the input/output device such as display 170 and input device 180, and the peripheral interface 123.

The display 170 displays status information of the electronic device 100, characters input by the user, a moving picture, and a still picture.

The input device 180 provides input data generated by a user's selection to the processor unit 120 through the input/output controller 160. Input device 180 minimally includes a single control button to control device 100, and may include a keypad for receiving the input data from the user.

Figure 2A:
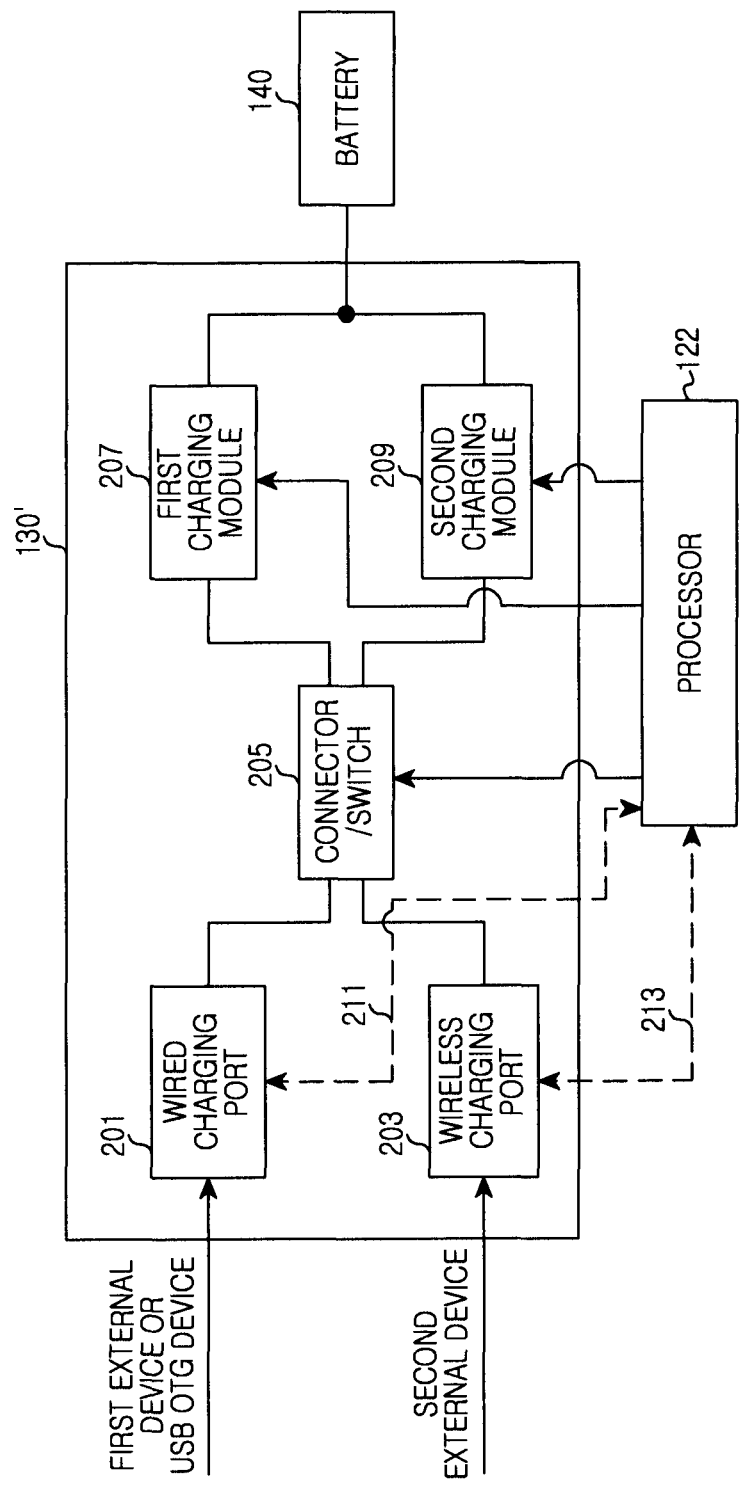
FIGS. 2A, 2B and 2C are block diagrams of exemplary chargers that may be used in the example electronic device.

FIG. 2A illustrates an embodiment 130' of charger 130 of FIG. 1. Charger 130' includes a wired charging port 201, a wireless charging port 203, a connector/switch 205, a first charging module 207, and a second charging module 209. Upon detecting charging from at least one external charger through the charging ports 201 and 203, charger 130' supplies the charging current (equivalently, "charging power") to the battery 140 via the charging modules 207 and 209, under control of processor 122. Charger 130' supplies charging current (equivalently referred to herein as "charging power") input via the wireless charging port 203 to the battery 140 via the second charging module 209. In so doing, when an OTG device is connected through the wired charging port 201, the charger 130' can also supply power to the OTG device through the first charging module 207 under the control processor 122. The charger 130' may provide the charging current of the wireless charging port 203 to the OTG device. A signal on path 211 and/or 213 is generated and provided from respective port 201 and/or 203, to apprise processor 122 when a connected external device is detected at the port. Values of charging currents flowing in each port 201, 203 may also be detected in the respective port and provided to processor 122 on paths 211, 213.

Figure 3:
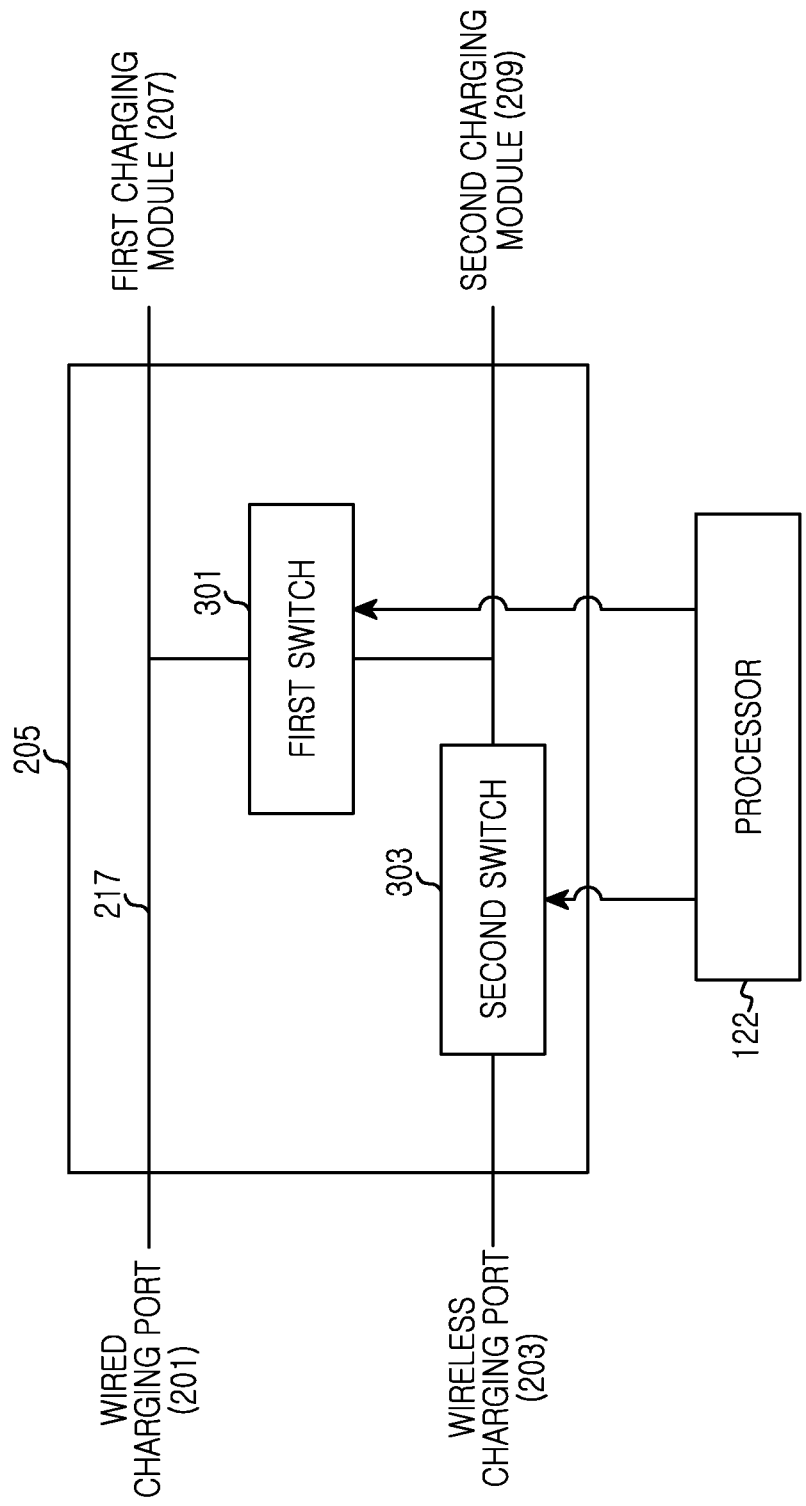
FIG. 3 is a block diagram of a connector that may be used in any of the exemplary chargers.

FIG. 3 illustrates an exemplary embodiment of the connector/switch 205 (hereafter, "switch 205" for brevity) of charger 130'. Wired charging port 201 is hard wired to first charging module 207 via conductor 217, and selectively connected to the second charging module 209 through a first switch 301. Wireless charging port 203 is selectively connected to each of the first and second charging modules 207, 209 via first switch 301 and second switch 303. First and second switches 301, 303 are controlled through control signals generated by processor 122. For example, when a charging current above a reference current is detected through the wired charging port 201 the first switch 301 is closed in order to charge the battery 140 through both the first charging module 207 and the second charging module 209, by diverting some of the current from port 201 towards the second module 209. On the other hand, when charging current below the reference current is detected through the wired charging port 201, the first switch 301 is opened to charge the battery 140 from the wired port 201 through the first charging module 207 only.

For example, in the switch 205 of FIG. 3, if insufficient voltage is detected at a voltage detect circuit within the wireless charging port, it is determined that no external wireless charger is present. In this case, both the first and second charging modules 207, 209 may be used to charge the battery from power of a connected wired charger at port 201 if it has sufficient charging power. Thereafter, if a wireless charger is subsequently detected, it may be ignored (by opening switch 303) since adequate charging is already occurring through the wired charger.

For example, in the switch 205 of FIG. 3, when the second switch 303 is connected all the time and the voltage level detect circuit for the wireless charging input is absent, the electronic device determines whether the wired charger is connected through the wired charging port 201 during the wireless charging of the wireless charging port 203. When the wired charger is connected through the wired charging port 201, the electronic device aborts the charging of the wireless charging port 203.

Next, the electronic device 100 (hereafter, "the device" for brevity) determines whether the charging is feasible using both of the first charging module 207 and the second charging module 209. For the charging using the first charging module 207, the electronic device opens the first switch 301 and charges the battery 140 through the wired charging port 201 using the first charging module 207. Next, the electronic device charges the wireless charging port 203 using the second charging module 209. Meanwhile, when the charging is feasible using both of the first charging module 207 and the second charging module 209, the electronic device opens the first switch 301 and charges using the first charging module 207 and the second charging module 209.

Figure 2B:
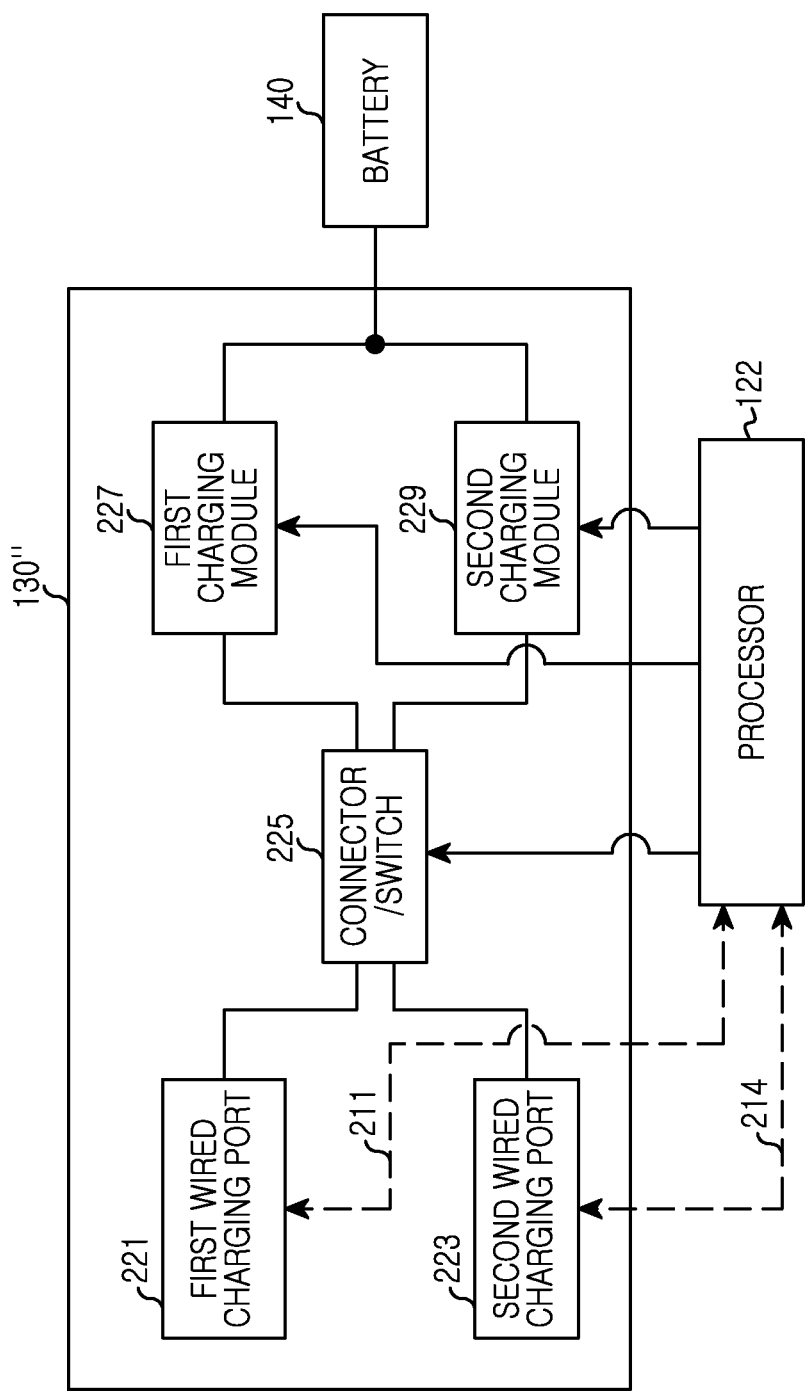

FIG. 2B illustrates an alternative embodiment 130″ of the charger 130. Charger 130″ differs from charger 130′ in that the wireless charging port 203 is replaced with a second wired charging port 223, which communicates with processor 122 via a path 214. A connector/switch 225 may be of the same construction as that shown in FIG. 3. An exemplary method of operation of charger 130″ is described later in connection with FIG. 8.

Figure 2C:
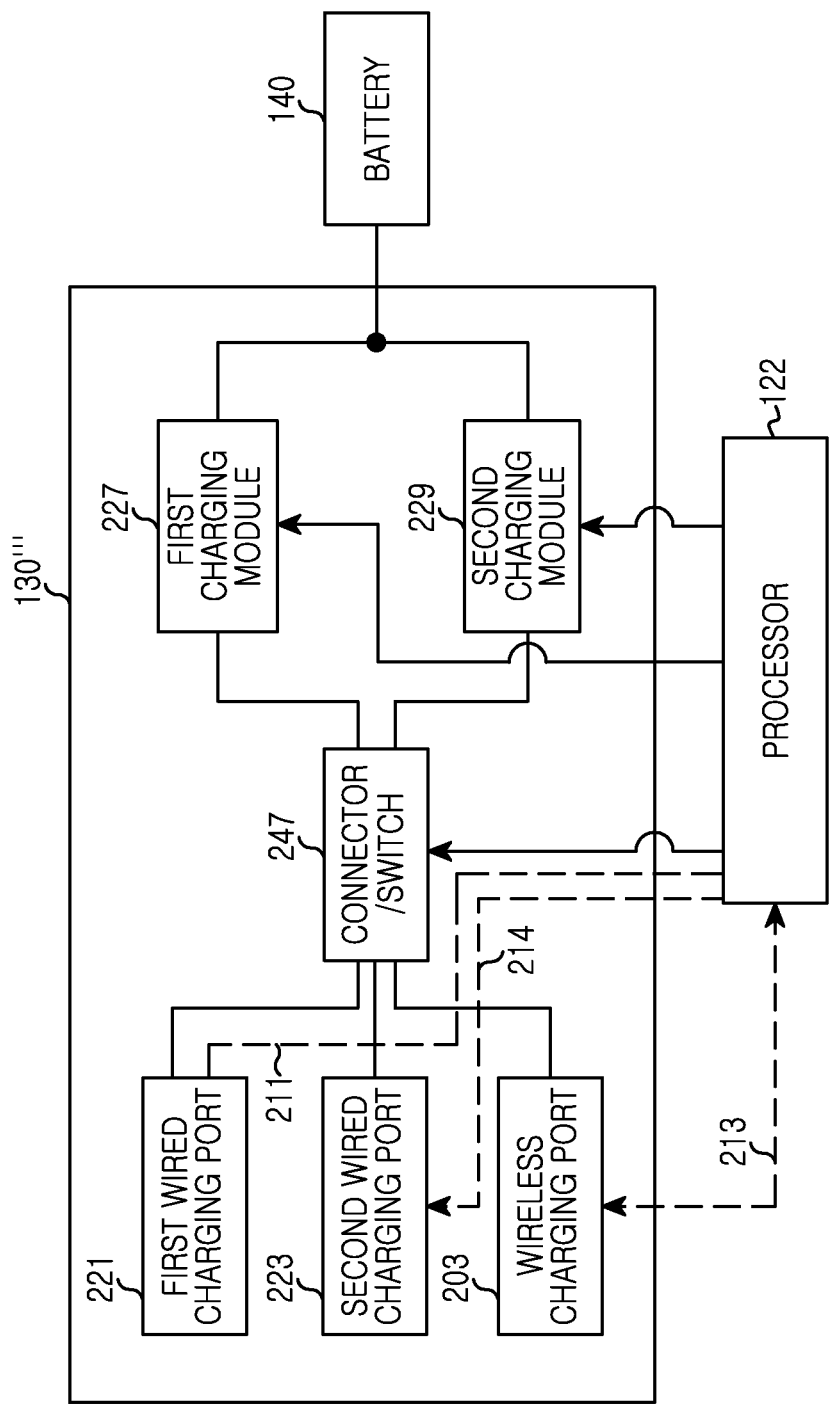

FIG. 2C illustrates another embodiment 130‴ of charger 130. Charger 130‴ includes first and second wired charging ports 221, 223, a wireless charging port 213 and a connector/switch 247 designed to selectively rout charging current from the three input ports. Charging current is selectively routed to charge the first and second charging modules using techniques similar to those for chargers 130′ and 130″.

Figure 4:
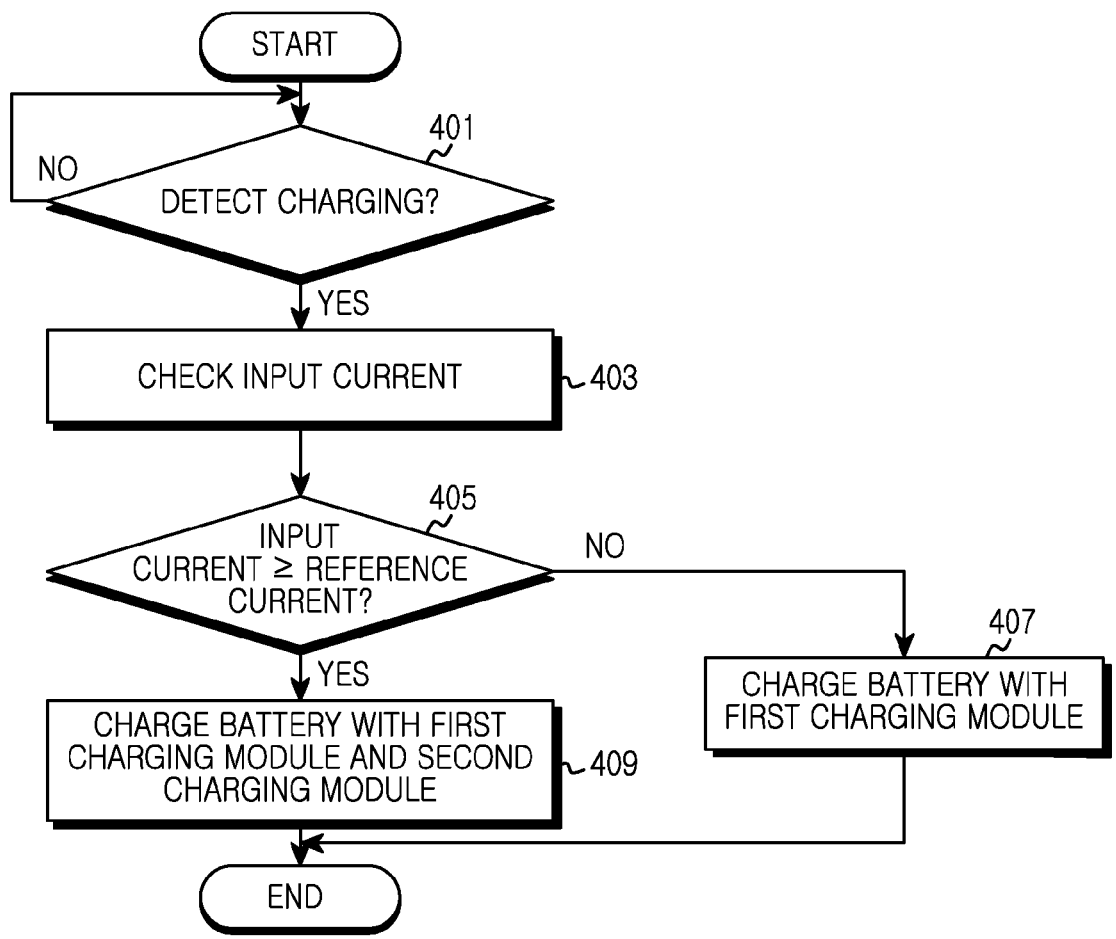
FIG. 4 is a flowchart of a method for charging a battery of the example electronic device using one or more of the charging modules according to one exemplary embodiment

FIG. 4 is a flowchart of a method for charging the battery of device 100 using one or more of the charging modules according to one exemplary embodiment. At step 401, it is determined whether charging by at least one external charger is detected. For example, the method determines whether a wired charging system using a Travel Adaptor (TA) charger or a USB is detected through a wired charging port of FIG. 2A, 2B or 2C. The method may also detect if at least one wireless charging system using magnetic induction, magnetic inductive resonance or microwaves through the wireless charging port 203.

When detecting the charging from the external charger, the electronic device checks the current input from an external charger in step 403, e.g., using a current check module of the charging port. This process may determine if a maximum charging current is drawn from the external charger.

In step 405, the electronic device compares the input current and a reference current to determine whether a quick charging is possible using a single charger (or alternatively, using multiple chargers).

When the current input from the external charger is smaller than the reference current, the battery is charged in a normal charging mode using the first charging module in step 407.

By contrast, when the current input from the external charger is greater than or equal to the reference current, a quick charging mode is recognized. Here, the battery is charged using the both the first and second charging modules in step 409. For example, when current of 1500 mA is drawn from the external charger, the battery may be charged with current of 1000 mA which is a maximum charging current of the first charging module, plus a current of 500 mA using the second charging module. For example, to reduce load of the first charging module, the electronic device may charge the battery with current of 750 mA from each of the first and second charging modules.

It is noted that the above charging operations are performed if the battery is not fully charged. Once a full charge is detected, the charging process ends. Suitable means of monitoring the state of the battery charge is included within device 100.

As charging the battery using the first charging module of the multiple charging modules, the device may activate the second charging module and use both the first and second charging modules so as to reduce the load of the first charging module.

In the embodiment of FIG. 4, the battery is charged by considering the current supplied by the external charger checked by a current check module, which may be included within the first or second charging modules or elsewhere within device 100. In so doing, the battery may be charged by taking into account a charging current setup process of the charging module as in the method of FIG. 5.

Figure 5:
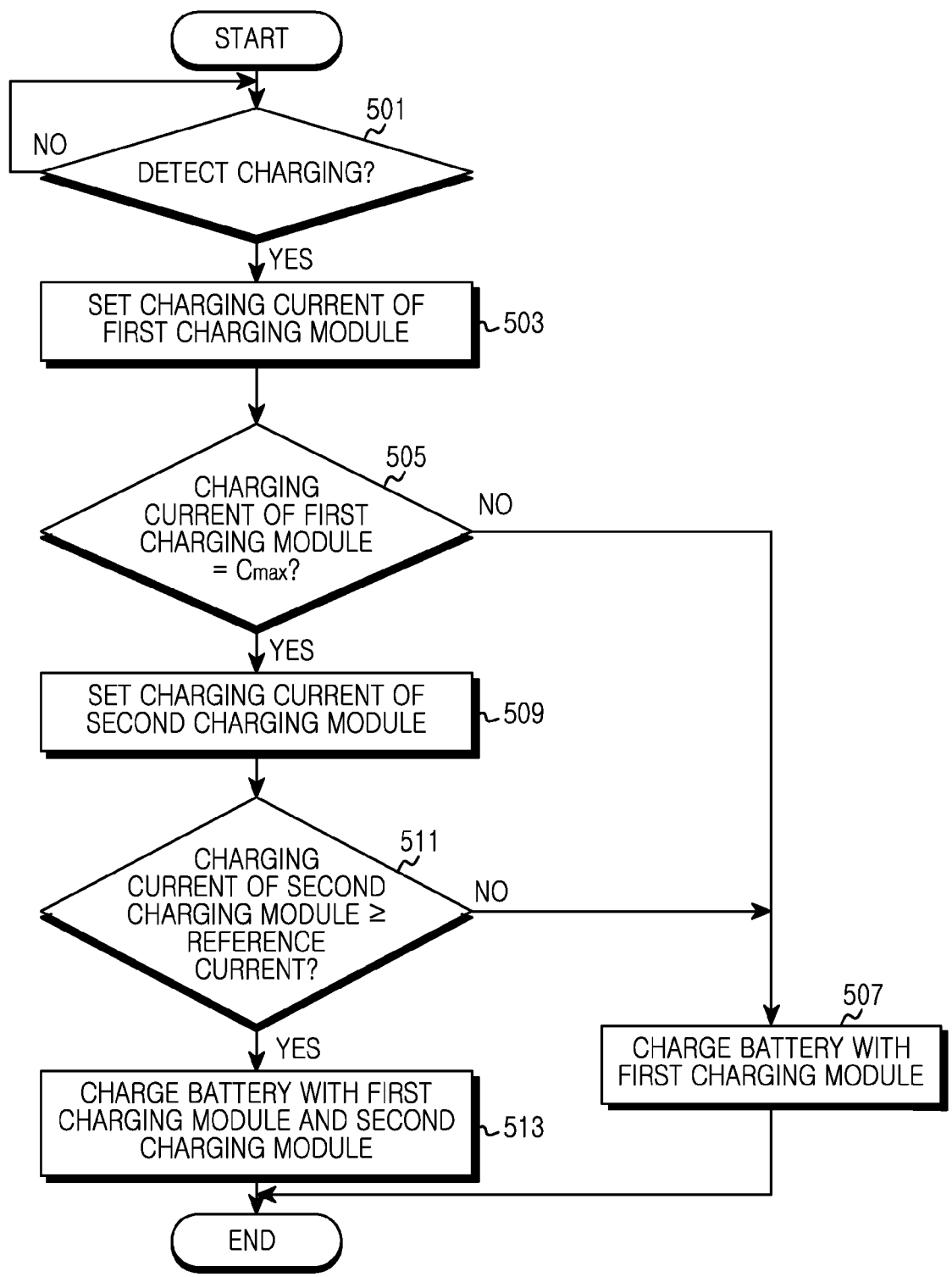
FIG. 5 is a flowchart of a method for charging a battery of the example electronic device using one or more charging modules according to an exemplary embodiment.

FIG. 5 is a flowchart of a method for charging the battery of device 100 using one or more charging modules according to an exemplary embodiment. The method can be performed using any of the arrangements of FIGS. 2A-2C and 3 for the charger and switch configurations. Step 501 determines whether charging from an external charger is detected through a charging port. For example, the electronic device determines whether the wired charging system using a TA charger or USB is detected through the wired charging port. For example, the device may detect at least one wireless charging system using magnetic induction, and inductive resonance or microwaves through the wireless charging port.

Upon detecting charging from at least one external charger, the device at step 503 sets the charging current of the first charging module, i.e., regulates it to a constant current. Here, the charging current is prevented from exceeding a set current limit to prevent damaging the battery and causing a safety hazard. For example, the device operates an AICL (Automatic Input Current Limit) algorithm of the first charging module 207 by opening the first switch 301 and closing the second switch 303 of FIG. 3. A charging setup can be attempted at this point with a maximum charging current $C_{max}$ i.e., the current limit determined via the AICL algorithm, of the first charging module 207. Depending on the power capability of the external charger connected to the wired charging port 201, the maximum charging current $C_{max}$ may or may not be reached. When the charging setup is impossible with the maximum charging current of the first charging module 207, charging current is gradually lowered until an acceptable charging current is reached; this acceptable current is then considered the set current of the first charging module 207. In so doing, the electronic device stores charging setup information of the first charging module 207 in a register of module 207. Here, the charging setup information of the first charging module 207 includes a charging voltage and the charging current of the first charging module 207.

In step 505, the electronic device determines whether the charging current of the first charging module 207 is set to $C_{ma}$, based on the current setting operations of step 503.

When the charging current is lower than $C_{max}$, the method charges the battery from the wired charging port (201 or 221) using just the first charging module in step 507, because there is no extra current to divert towards the second charging module. In so doing, the first charging module charges the battery with the charging current which is set in step 503.

By contrast, when the charging current of the first charging module is set to $C_{max}$, the electronic device recognizes that additional current from the external charger at the wired charging port 209 may be available. Hence, current supplied from the wired external charger is diverted to the second charging module by closing the first switch 301, and charging current of the second charging module is set in step 509. For example, an AICL algorithm of the second charging module 209 is operated. In this process, the second switch 303 of FIG. 3 is opened, to ascertain if enough current for fast charging can be obtained just from the external wired charger at port 201. Here, the charging setup is attempted with the maximum charging current of the second charging module 209. When the charging setup is impossible with the maximum charging current of the second charging module, the device gradually lowers the charging current and thus sets the charging current of the second charging module 209. In so doing, the device stores charging setup information of the second charging module 209 in a register of the second charging module 209. Here, the charging setup information of the second charging module 209 includes a charging voltage and the charging current of the second charging module 209.

In step 511, the charging current of the second charging module (e.g., the setup current stored in its register) is compared with a reference current. The reference current is a current required for a quick charging operation using the multiple charging modules in the electronic device. The reference current can vary according to the maximum charging current level $C_{max}$ of the first charging module.

When the charging current of the second charging module is smaller than the reference current during this operation, the battery is charged from the wired port (201 or 221) using just the first charging module in step 507, by opening the first switch 301.

By contrast, when the charging current of the second charging module is greater than or equal to the reference current, the quick charging mode is recognized. Hence, the battery is charged using both the first and second charging modules in step 513. For example, when the external charger inputs current of 1500 mA, the battery may be charged with current of 1000 mA as an exemplary the maximum charging current of the first charging module, plus current of 500 mA using the second charging module. Alternatively, to reduce the load of the first charging module, the current drawn by the first charging module may be reduced while current drawn by the second charging module is increased, e.g., the battery may be charged with current of 750 mA from each of the first and second charging modules.

It is noted that the above charging operations are performed if the battery is not fully charged. Suitable means of monitoring the state of the battery charge is included within device 100. Also, in the conditions described above, switch 303 is opened to enable all charging to be sourced from the external wired charger at port 201. In this state, if disconnection of the wired external charger is detected, switch 303 may be immediately closed to allow battery charging via at least the second charging module from a detected wireless external charger at port 203.

During the battery charging using the first charging module of the multiple charging modules, the electronic device may activate the second charging module and use both the first and second charging modules so as to reduce the load of the first charging module.

In the embodiment of FIG. 5, the electronic device charges the battery using the plurality of charging modules if sufficient supply current is available. In another embodiment, exemplified in FIG. 6, both wireless charging and an OTG mode may be performed at the same time.

Figure 6:
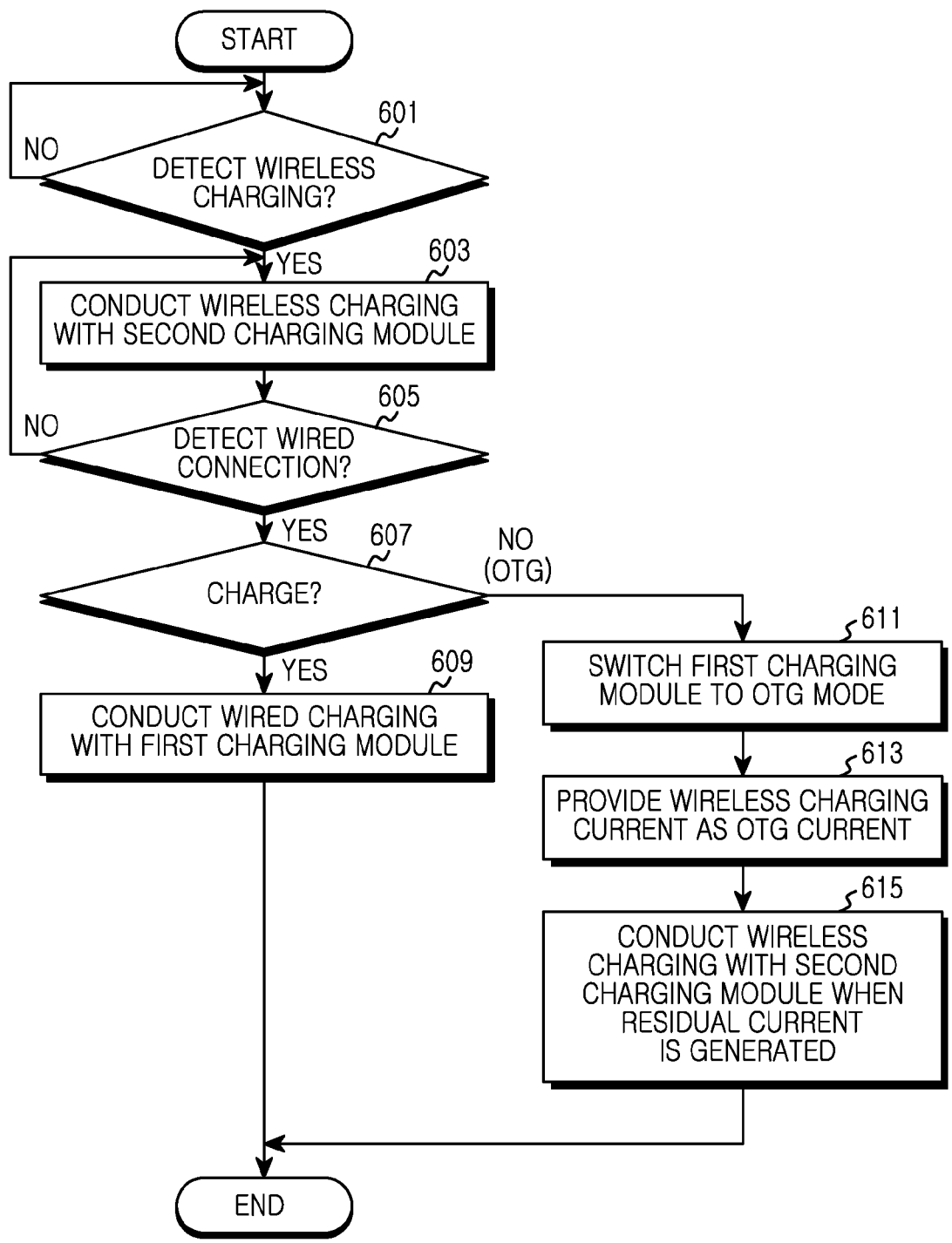
FIG. 6 is a flowchart of a method for charging a battery and operating in an OTG mode using the plurality of the charging modules in the example electronic device according to an exemplary embodiment.

FIG. 6 is a flowchart of a method for charging the battery and operating in an OTG mode using the plurality of the charging modules in the device 100 according to an exemplary embodiment. Here, device 100 first determines whether charging from an external wireless charger is detected in step 601. It is assumed at this point that no external wired charger is detected at any of the wired charging ports. For example, the electronic device detects at least one wireless charging system using magnetic induction, and inductive resonance or microwaves through the wireless charging port 203 as shown in FIG. 2A. In so doing, the device may detect the wireless charging by use of a voltage level detect circuit of the wireless charging port 203.

Upon detecting the charging of the wireless charger, the battery is wirelessly charged using the second charging module in step 603. For example, device 100 sets the charging current in a manner similar to that described above, e.g., operating the AICL algorithm of the second charging module 209 by opening the first switch 301 and closing the second switch 303 of FIG. 3. Charging setup is first tried with a maximum charging current of the second charging module 209. When the charging setup is impossible with the maximum charging current, the charging current is gradually lowered until an acceptable charging current is reached, and set as the charging current of the second charging module 209. In so doing, the electronic device stores charging setup information of the second charging module 209 in its register. Next, the battery is charged with the set charging current.

In step 605, during or after the wireless charging, device 100 determines whether a wired connection is detected through the wired charging port. The wired connected device might be a charging device that supplies charging current to device 100, or, a client device that is charged by device 100 (receives charging current from device 100). For example, the presence or absence of a wired charging system using a TA charger or USB OTG device is detected through the wired charging port 201 of FIG. 2A.

When detecting the wired connection through the wired charging port, device 100 determines whether any charging is detected (i.e., whether current is being supplied) from the external device connected to the wired charging port in step 607.

If so, wired charging is performed using the first charging module in step 609. Depending on the amount of current available via the wired charging, the wireless charging may or may not be aborted. The available current can be determined in the manner described above for the first charging module. This may entail operating the AICL algorithm of the first charging module 207, determining whether a maximum charging current is drawn by the first charging module, etc. If a maximum charging current is not available, battery charging via the wired charger is performed through the first charging module 207, while the second charging module 209 continues to charge the battery via the wireless charger.

On the other hand, if maximum charging current of the first charging module is determined available via the wired charger, the device may check whether the quick charging mode is feasible. In one implementation, the quick charging mode is automatically determined to be feasible if the second charging module is already drawing a current equal to the reference current via charging through the external wireless device. That is, the battery is concurrently charged in a quick charging mode by the maximum current flowing through the first charging module and the reference current flowing in the second charging module.

In another implementation, the wireless charging is temporarily aborted to determine if the quick charge mode can be handled just by the wired charger. For example, the device may abort the wireless charging by closing the first switch 301 and opening the second switch 303. The quick charging mode determination can be performed in the same manner described above in connection with FIG. 5. For example, the process determines if the reference current is drawn by the second charging module; if so, the quick charging mode is determined to be feasible and is therefore implemented. If not, the wireless charging is resumed by opening the first switch 301 and closing the second switch 303.

Returning to step 607, when charging is not detected from the external wired device, and the connected wired device is detected to be an OTG device, the first charging module is switched to an OTG mode in step 611. In this mode, current is supplied from device 100 to the external OTG device. In one implementation, current from the wireless charger is used to directly charge the OTG device instead of being used to charge the battery 140. In this case, voltage at the first charging module is lowered below the wireless charging voltage within the wireless charging port in order for charging current to be supplied from the wireless charger rather than from the battery (via the first charging module).

In step 613, device 100 uses the wireless charging current as an OTG current. When the current required by the OTG device is high, the wireless charger is subject to a voltage drop. To prevent such voltage drop, device 100 supplies necessary additional current from battery 140 through the first charging module to the OTG device. Here, it is assumed that the first switch 301 is closed to divert the wireless current from the wireless charger to the OTG device.

In step 615, the electronic device wirelessly charges the battery using the second charging module when a residual current is generated. That is, when the OTG current required is low, all the OTG device current is supplied from the wireless charger, and the wireless charger may still be able to concurrently charge the battery with residual current.

Note that when the battery is determined to be fully charged, the above-described charging of the battery is suspended. When the external wireless charger or wired device is detected to be disconnected through a detector within the charging port, the charging processes are altered to reflect the situation.

Figure 7:
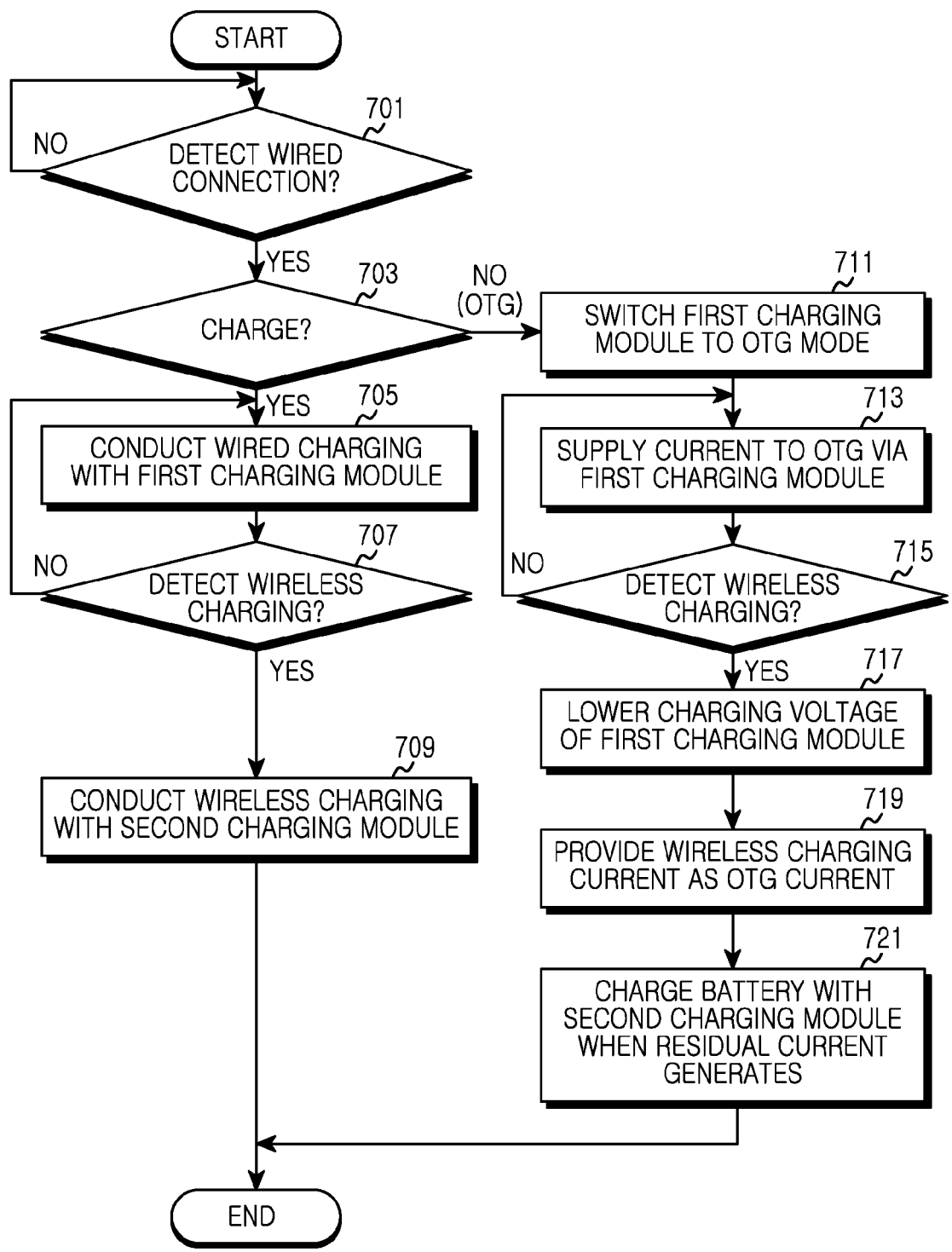
FIG. 7 is a flowchart of a method for charging a battery in the example electronic device and performing an OTG mode using a plurality of charging modules according to another exemplary embodiment.

FIG. 7 is a flowchart of a method for charging the battery in device 100 and performing an OTG mode using a plurality of the charging modules according to another exemplary embodiment.

At step 701, it is determined whether a wired external device, e.g., a TA charger or a USB OTG device, is connected at the wired charging port.

If so, step 703 determines whether charging is detected from the wired external device.

When wired charging is detected, wired charging of the battery is performed with the first charging module in step 705. For example, device 100 sets the charging current as described above, e.g., operating the AICL algorithm of the first charging module 207, etc., and then charges the battery with the set charging current. The device may also check the quick charging mode capability of the wired charger and charge the battery using the first and second charging modules as in the method of FIG. 5.

In step 707, the device determines whether the charging from a wireless charger is detected through the wireless charging port, e.g., as described above.

Upon detecting the charging of the wireless charger, the device wirelessly charges the battery using the second charging module in step 709. For instance, charging current is set in the manner described earlier, e.g., operating the AICL algorithm of the second charging module 209, determining if maximum charging current is available, etc. The battery is then charged with the set charging current. Alternatively, if sufficient power is available from the wired charger to perform the quick charging mode via the first and second charging modules, the second switch 303 could be opened to abort charging by the wireless charger.

Returning to step 703, when no charging is detected from the external wired device connected to the wired charging port, and an OTG device is recognized connected to the wired charging port, the first charging module is switched to the OTG mode in step 711.

In step 713, the electronic device supplies the current from the battery to the OTG device via the first charging module and communicates data with the OTG device. In this condition, device 100 determines at step 715 whether charging is detected from the wireless charger through the wireless charging port.

Upon detecting the charging of the wireless charger, the electronic device lowers the charging voltage of the first charging module in order to use the wireless charging current as the current for the OTG device in step 717. Thus, the first charging module stops the current supply from the battery to the OTG device.

In step 719, the electronic device provides the wireless charging current as the OTG current. When the current required by the OTG device is high, the wireless charger is subject to a voltage drop. To prevent this voltage drop, device 100 may supply necessary additional current from battery 140 through the first charging module to the OTG device.

In step 721, the electronic device wirelessly charges the battery using the second charging module if residual current is generated (as in step 615 described above).

Figure 8:
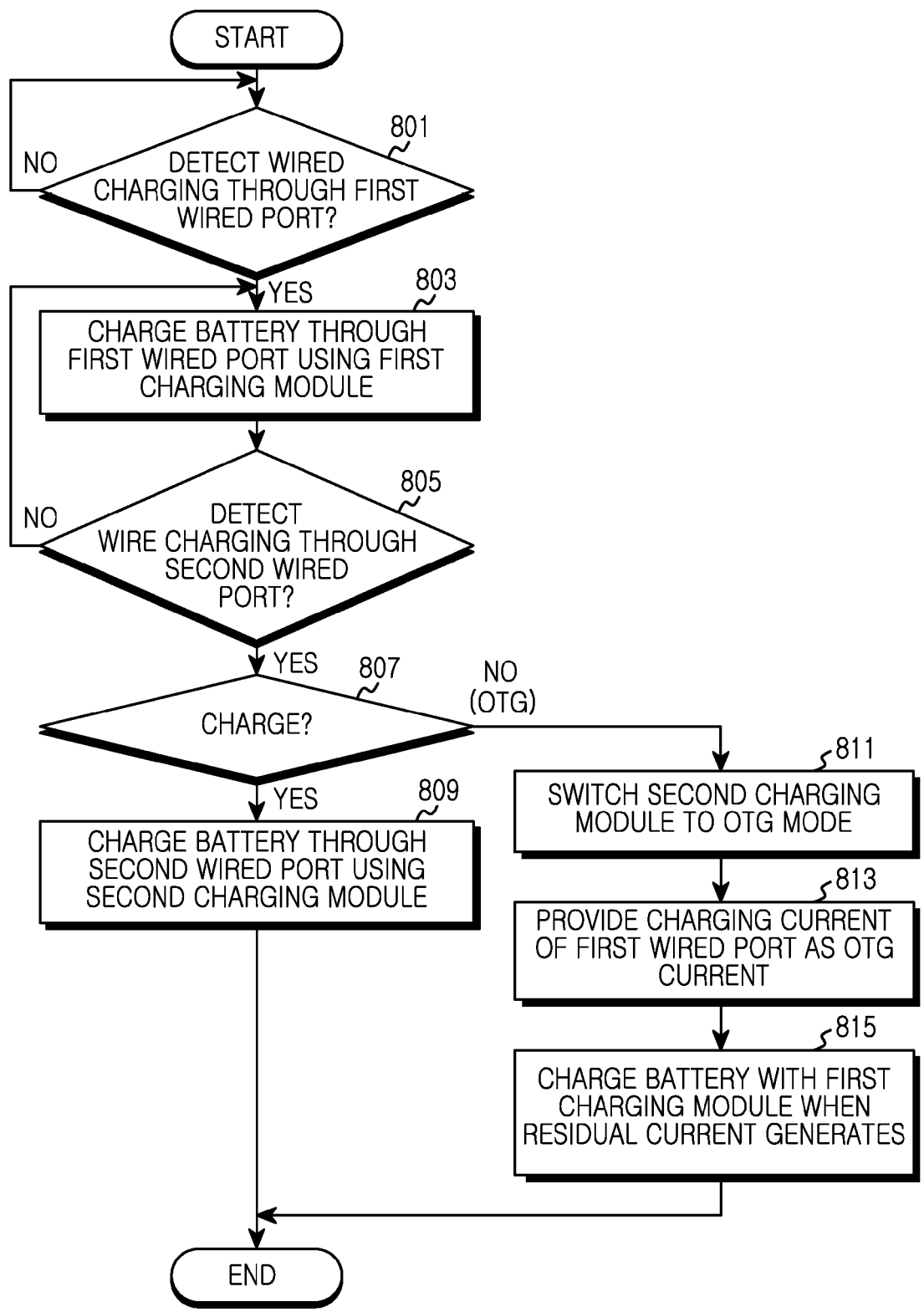
FIG. 8 is a flowchart of a method for charging a battery of the example electronic device and entering an OTG mode using a plurality of a charging modules according to yet another exemplary embodiment.

FIG. 8 is a flowchart of a method for charging the battery of device 100 and entering an OTG mode using a plurality of the charging modules according to yet another exemplary embodiment. This method may be performed with device 100 configured with the charger 130" of FIG. 2B.

At step 801, the device determines whether charging of the external charger is detected through the first wired charging port 221 (e.g., via a connected TA charger or USB device).

If so, the battery is charged with the first charging module through the first wired port in step 803. For example, the device sets the charging current as described above, e.g., operating the AICL algorithm of the first charging module 227, etc., and then charges the battery with the set charging current. The quick charging mode using just the wired charger may then be checked, and if feasible, the battery may be charged in the quick charging mode using the first and second charging modules with the wired charger as in the method of FIG. 5.

In step 805, the electronic device determines whether a wired connection is detected through the second wired charging port 223. For example, the electronic device determines whether the wired charging system using the TA charger and the USB is detected through the second wired charging port 223.

If so, device 100 determines whether charging is detected from the external device connected to the second wired charging port in step 807.

When such charging is detected, battery charging is performed through the second wired charging port with the second charging module in step 809. For example, the device sets the charging current of the second charging module 229 in the manner described above (e.g. operating an AICL algorithm, checking for maximum charging current, etc.). The battery can then be charged via the second charging module 229 with the set charging current.

When no charging is detected from the external device connected to the second wired charging port, the electronic device recognizes that an OTG device is connected to the second wired charging port. Hence, the electronic device switches the second charging module to an OTG mode in step 811. In so doing, the electronic device sets the voltage of the second charging module lower than voltage at the first wired charging port, so that current is supplied to the OTG device from the wired charger at the first wired charging port rather than from the battery via the second charging module.

In step 813, the electronic device provides the charging current of the first wired port as the OTG current. When the current required by the OTG device is high, the wired charger is subject to a voltage drop. To avoid this, device 100 may supply the necessary current from the battery through the second charging module to the OTG device.

In step 815, device 100 concurrently conducts wired charging of the battery using the first charging module when residual current is generated.

As described, in the exemplary method of FIG. 8, the electronic device may charge the battery using the respective charging modules with charging power supplied from a plurality of external chargers. In so doing, the electronic device may charge the battery using the plurality of the charging modules with the power from any particular one of the external chargers if the power level of the particular charger is determined to be sufficient.

As set forth above, the electronic device including the plurality of the charging modules determines the charging module based on the type of the external charger and the charging capacity. Therefore, the electronic device can enhance the charging efficiency and fulfill quick charging by selecting the effective charging manner according to the situation.

In addition, the electronic device including the plurality of the charging modules can concurrently charge the battery and connect an OTG device, to thus enhance user convenience and battery life of the electronic device.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for charging a battery in an electronic device, comprising:
   conducting wireless charging the electronic device using a second charging module, when a second switch is closed in response to detecting a second external device through a second input port;
   checking, in response to detecting a charging input from a first external device, a first current inputted through a first input port,
   conducting wired charging the electronic device using a first charging module if wired charging is detected from an external wired device;
   supplying a current from the electronic device to the first external device using the first charging module if wired charging is not detected from the external wired device,
   wherein the first input port is coupled with a first external electronic device,
   wherein the second input port is coupled with a second external electronic device,
   wherein the second switch is connected with the second input port, the second charging module, and a first switch,
   wherein the first switch selectively connects the first input port to the second input port, and a second switch,
   wherein the second charging module, when the first switch is closed, is connected with the first charging port, and the second charging module, when the first switch is opened and the second switch is closed, is not connected with the first input port and is connected with the second input port.

2. The method of claim 1, further comprising:
   in response to detecting a wired connection from the external wired device, temporarily aborting the wireless charging the electronic device.

3. The method of claim 1, further comprises:
   determining an external device to be used for the battery charging by considering the first current inputted from the first external device and a second current inputted through the second input port from the second external device.

4. The method of claim 3, further comprising:
   when determining one of the first and second external device as the external device for the battery charging, charging the battery with one of the first and second current using the first charging module or the second charging module.

5. The method of claim 1, further comprising:
   determining whether the first external device is a USB On-The-Go (OTG) device; and
   when the first external device is the USB OTG device, supplying the current to the USB OTG device using one of the plurality of charging modules.

6. The method of claim 5, further comprising:
   when a current inputted from the second external device is greater than the current used by the USB OTG device, supplying the battery using residual current inputted from the second external device.

7. An electronic device comprising:
   at least one battery;
   a plurality of charging modules including a first charging module and a second charging module;
   at least one processor;

a first input port to be coupled with a first external electronic device;

a second input port to be coupled with a second external electronic device;

a first switch to selectively connect the first input port to the second input port, and a second switch;

a first charger connected to the first port, and the first charger to charge the battery;

a second charger selectively connected to the second port via the second switch, and the second charger to charge the battery;

a memory; and at least one program stored in the memory and configured for execution by the at least one processor, wherein the program comprises at least one instruction for:

conducting wireless charging the electronic device using the second charging module, when the second switch is closed in response to detecting the second external device through the second input port, checking, in response to detecting a charging input from the first external device, a first current inputted through the first input port, conducting wired charging the electronic device using the first charging module if wired charging is detected from an external wired device, supplying a current from the electronic device to the first external device using the first charging module if wired charging is not detected from the external wired device, wherein the second switch is connected with the second input port, the second charging module, and the first switch, wherein the second charging module, when the first switch is closed, is connected with the first charging port, and the second charging module, when the first switch is opened and the second switch is closed, is not connected with the first input port and is connected with the second input port.

8. The electronic device of claim 7, further comprising:
an instruction for in response to detecting a wired connection from the external wired device, temporarily aborting the wireless charging the electronic device.

9. The electronic device of claim 7, wherein the instruction for determining an external device to be used for the battery charging by considering the first current inputted from the first external device and a second current inputted through the second input port from the second external device.

10. The electronic device of claim 9, further comprising:
an instruction for, when one of the first and second external device is determined as the external device for the battery charging, charging the battery with one of the first and second current.

11. The electronic device of claim 7, further comprising:
an instruction for, determining whether the first external device is a USB On-The-Go (OTG) device, and when the first external device is the USB OTG device, supplying the current to the USB OTG device using one of the plurality of charging modules.

\* \* \* \* \*